Figure 1:
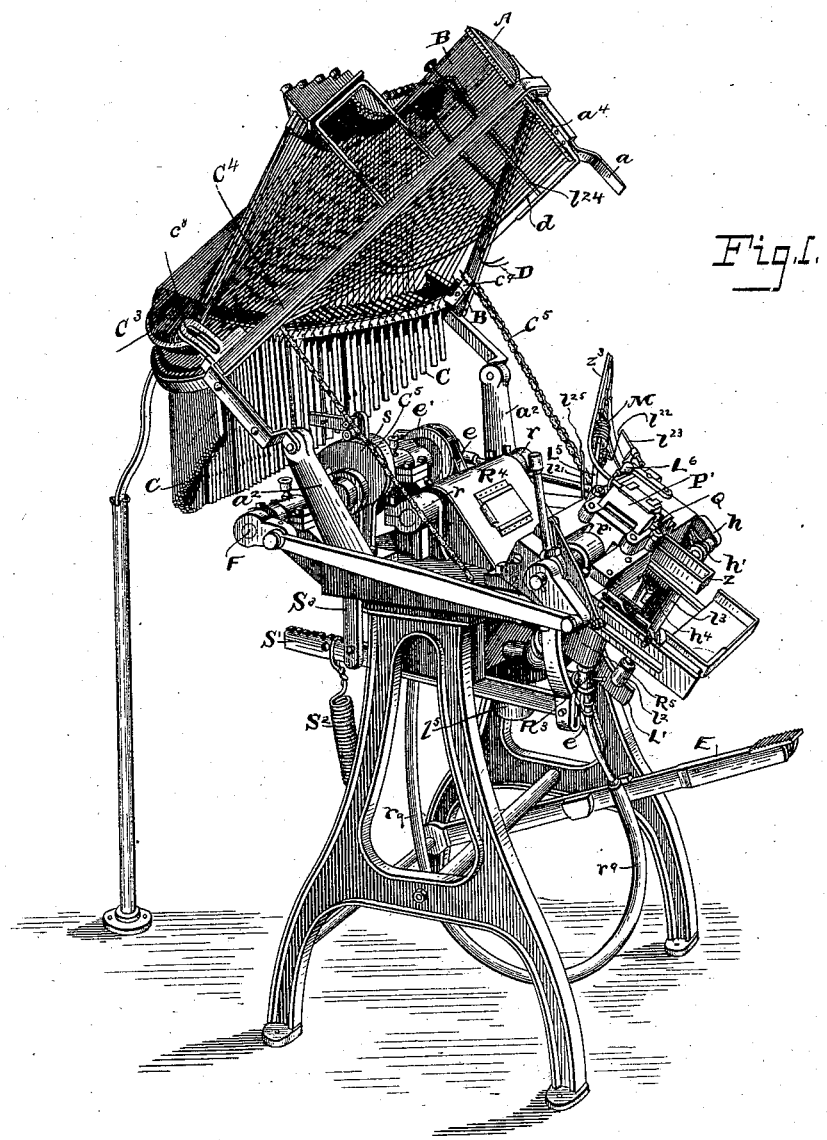

(No Model.)

J. R. ROGERS.
TYPOGRAPH.

No. 557,232.

11 Sheets—Sheet 1.

Patented Mar. 31, 1896.

WITNESSES
Victor J. Evans.
J. C. Turner

INVENTOR
J. R. Rogers
BY Hall and Fay
HIS ATTORNEYS (No Model.) 11 Sheets—Sheet 2.

J. R. ROGERS.
TYPOGRAPH.

No. 557,232. Patented Mar. 31, 1896.

WITNESSES.
Victor J. Evans.
J. C. Turner

INVENTOR
J. R. Rogers
By Hall and Fay
HIS ATTORNEYS.

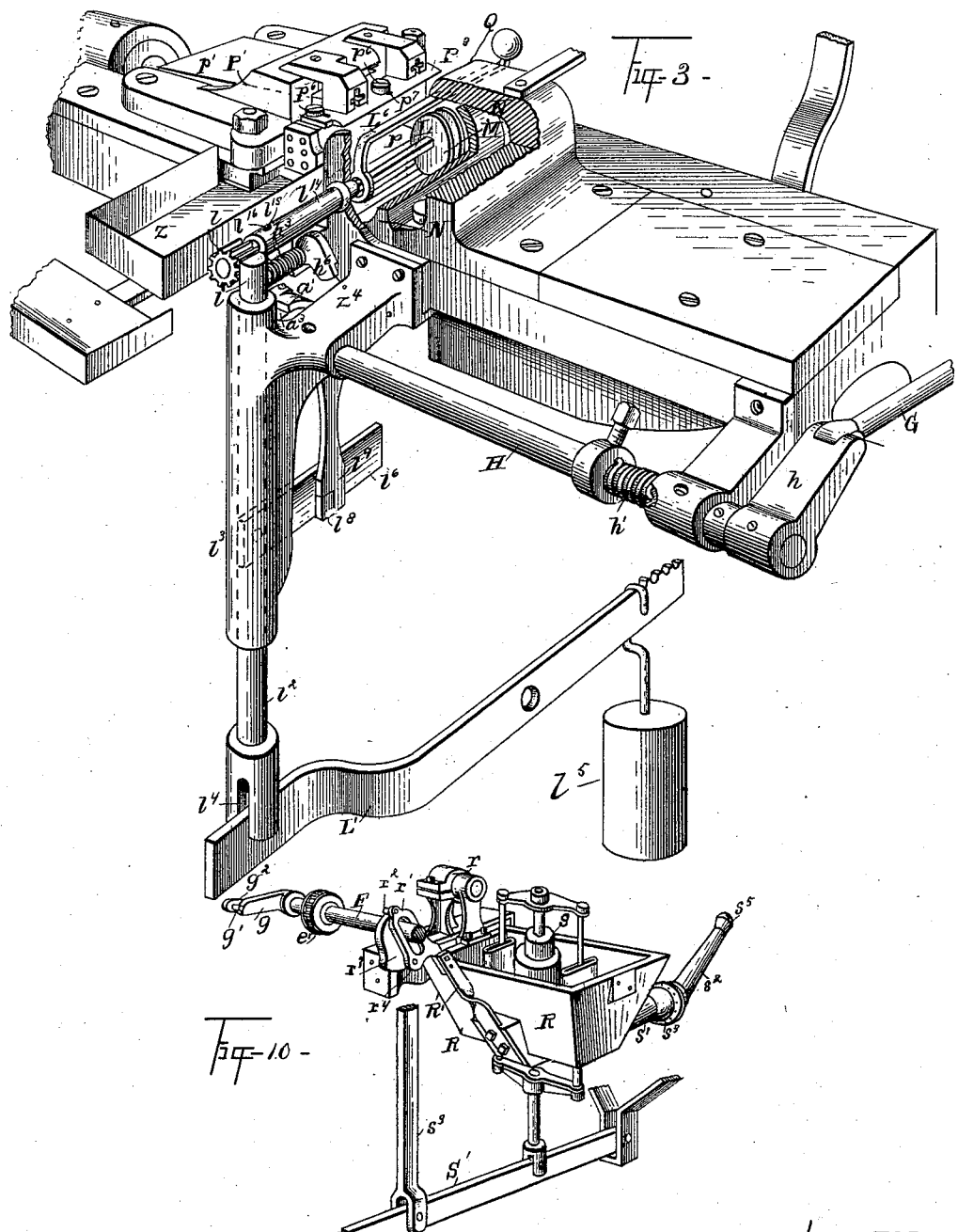

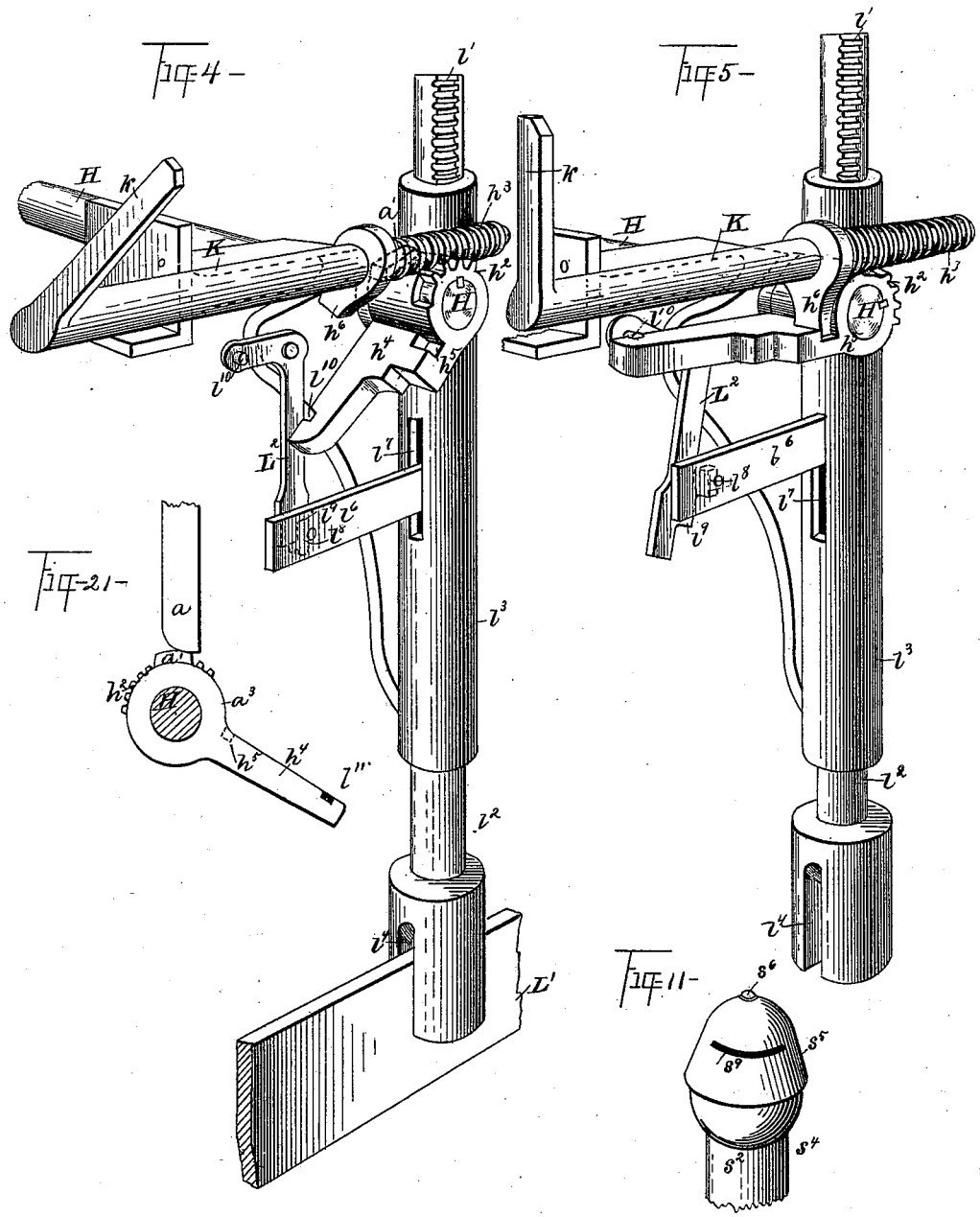

(No Model.)　　　　　　　　　　　　　　　　11 Sheets—Sheet 5.
J. R. ROGERS.
TYPOGRAPH.
No. 557,232.　　　　　　　　　　　　Patented Mar. 31, 1896.
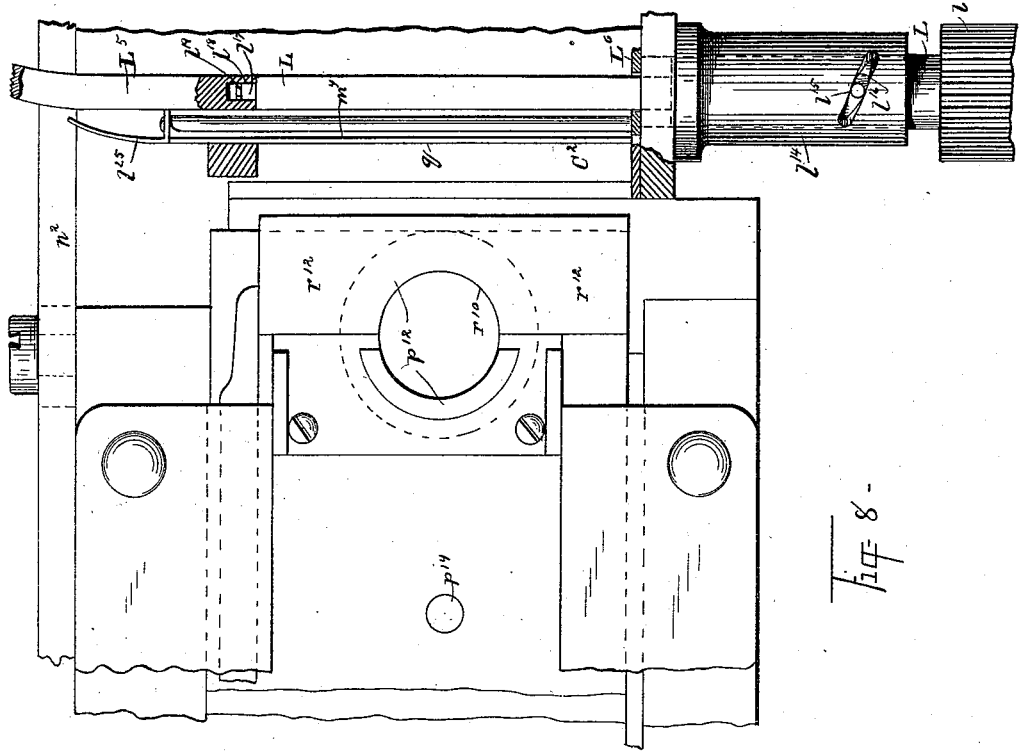
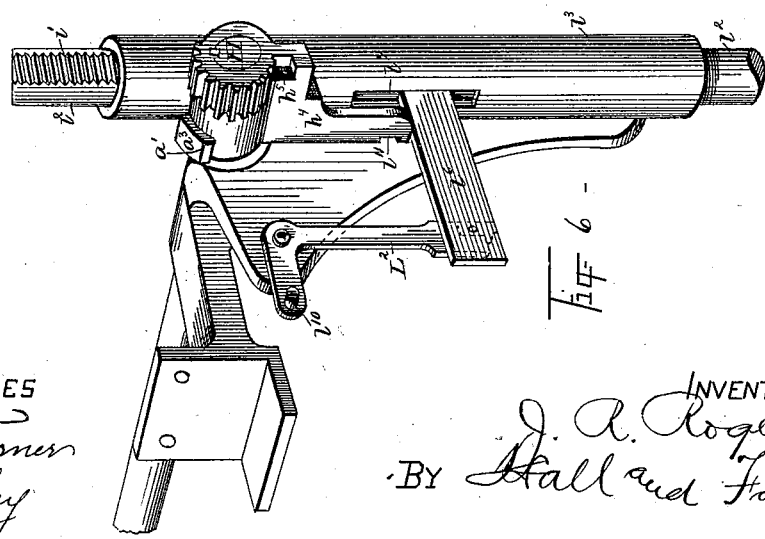
WITNESSES　　　　　　　　　　　　　　　　INVENTOR (No Model.) 11 Sheets—Sheet 6.

J. R. ROGERS.
TYPOGRAPH.

No. 557,232. Patented Mar. 31, 1896.

WITNESSES
J. C. Turner
N. H. Fay

INVENTOR
J. R. Rogers
BY Hall and Fay
HIS ATTORNEYS (No Model.)    J. R. ROGERS.    11 Sheets—Sheet 7.
TYPOGRAPH.
No. 557,232.    Patented Mar. 31, 1896.
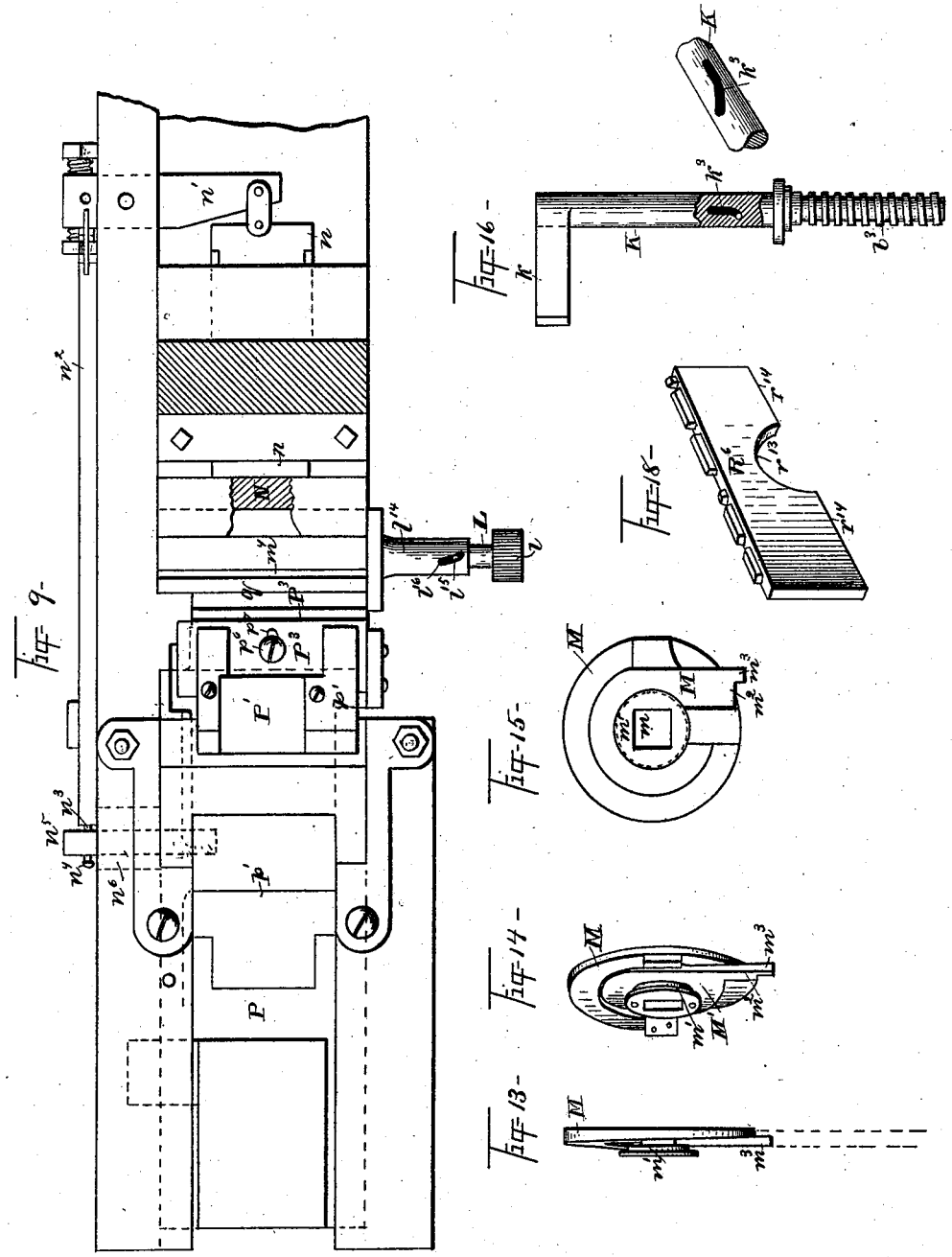

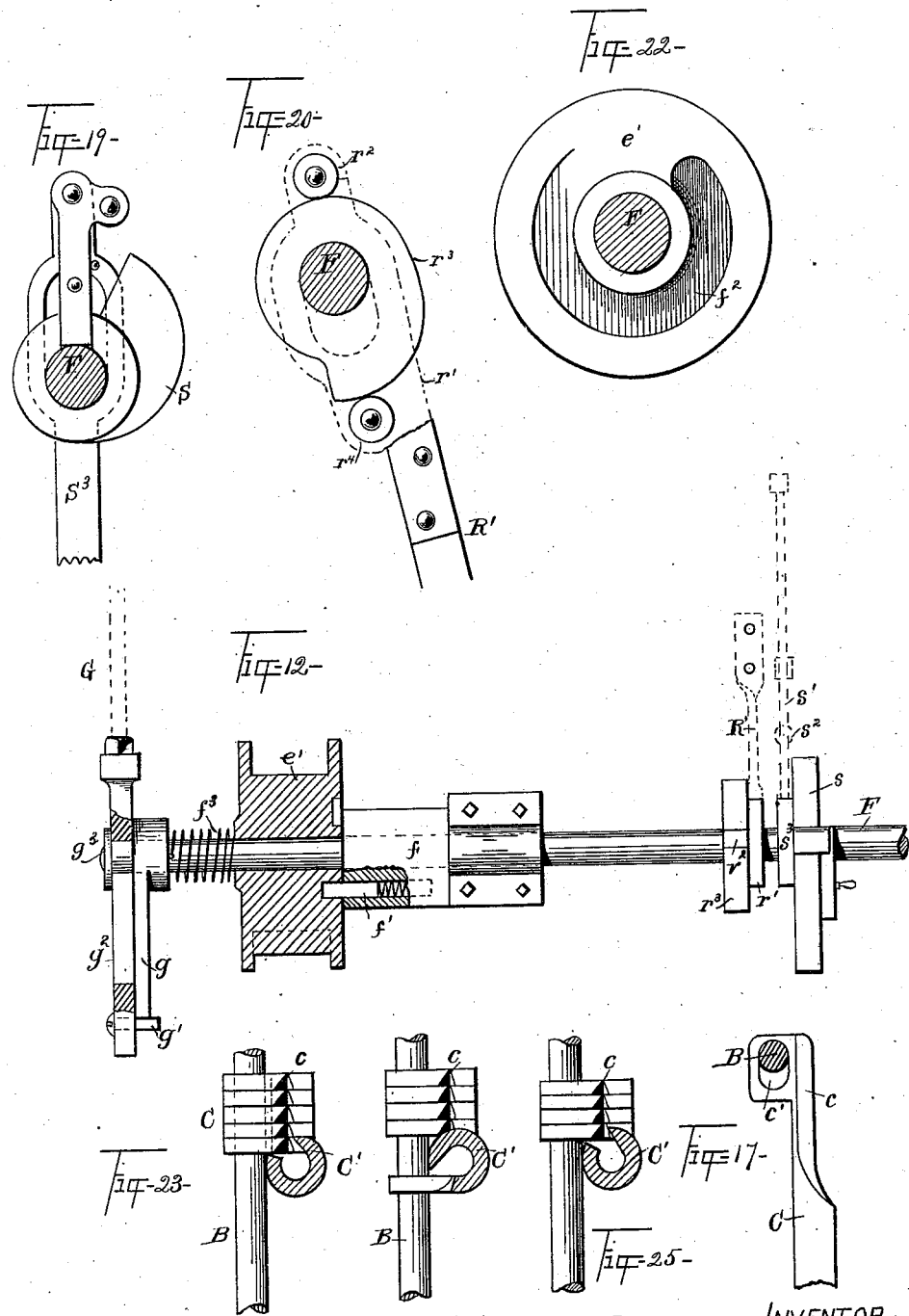

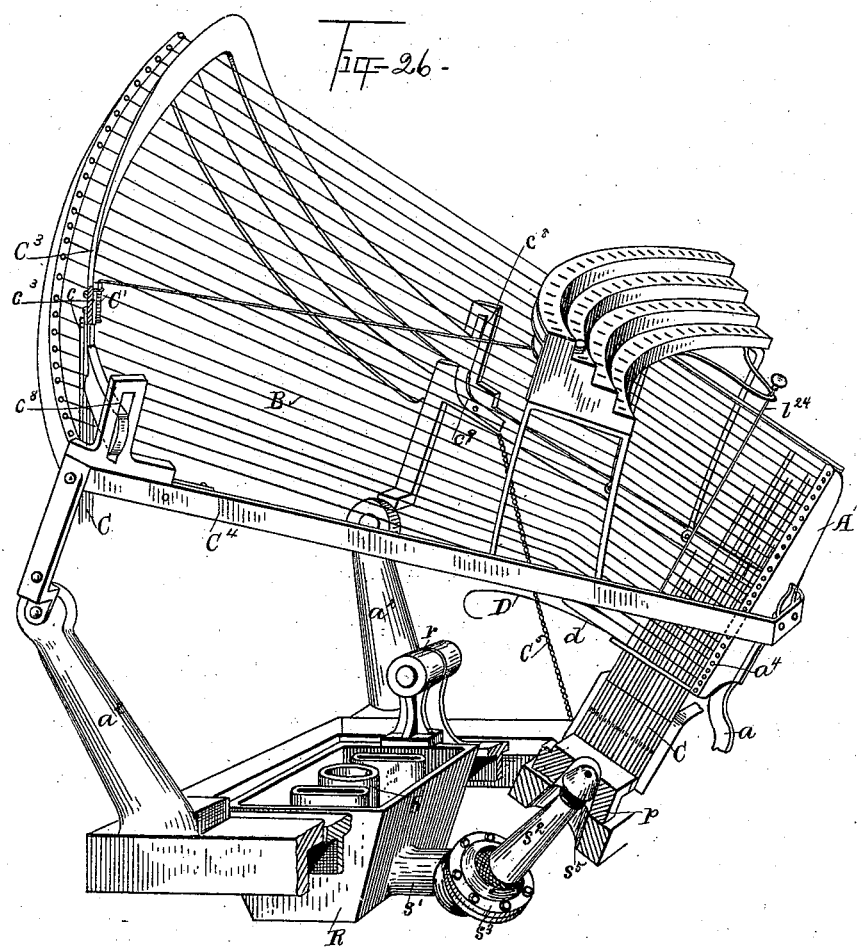

(No Model.) 11 Sheets—Sheet 10.
J. R. ROGERS.
TYPOGRAPH.
No. 557,232. Patented Mar. 31, 1896.
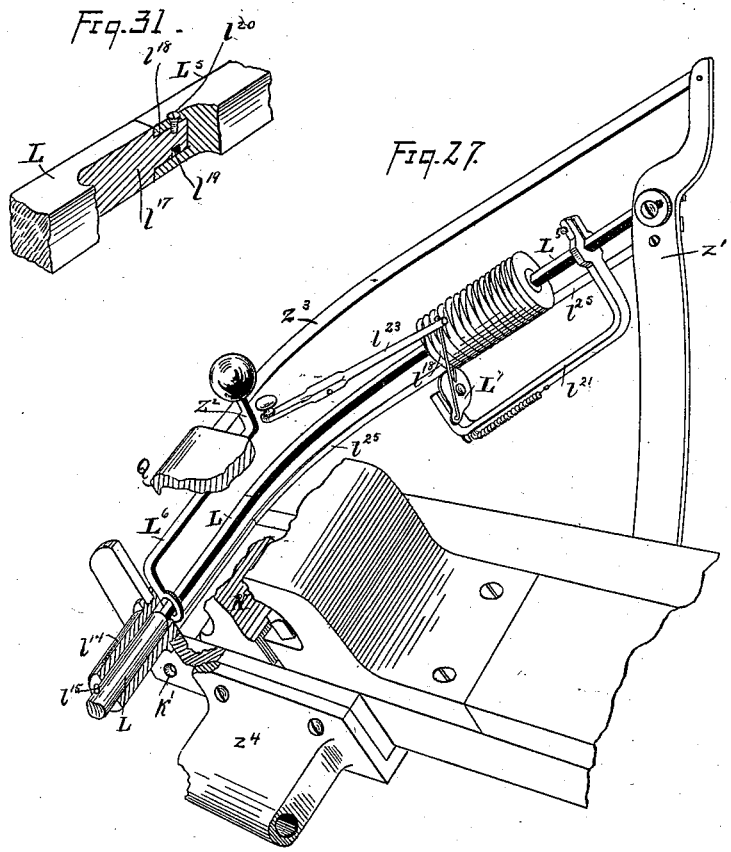
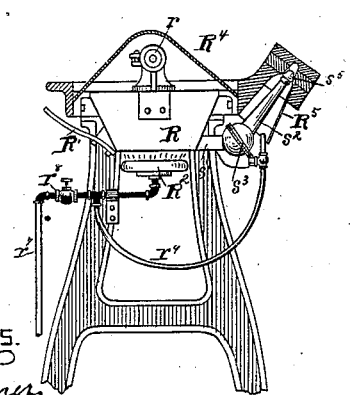
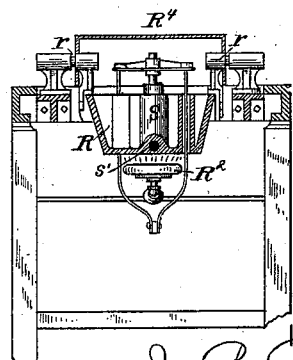
WITNESSES.
INVENTOR.

(No Model.) 11 Sheets—Sheet 11.

J. R. ROGERS.
TYPOGRAPH.

No. 557,232. Patented Mar. 31, 1896.

WITNESSES
J. C. Turner
N. H. Fay

INVENTOR
J. R. Rogers
By Hall and Fay
HIS ATTORNEYS

United States Patent Office.

JOHN R. ROGERS, OF CLEVELAND, OHIO, ASSIGNOR, BY MESNE ASSIGNMENTS, TO THE MERGENTHALER LINOTYPE COMPANY, OF NEW JERSEY.

TYPOGRAPH.

SPECIFICATION forming part of Letters Patent No. 557,232, dated March 31, 1896.

Original application filed February 24, 1890, Serial No. 341,609. Divided and this application filed September 23, 1890. Serial No. 365,883. (No model.)

*To all whom it may concern:*

Be it known that I, JOHN RAPHAEL ROGERS, a citizen of the United States, and a resident of Cleveland, county of Cuyahoga, and State of Ohio, have invented certain new and useful Improvements in Typographs, of which the following is a specification, the principle of the invention being herein explained and the best mode in which I have contemplated applying that principle, so as to distinguish it from other inventions.

This application covers subject-matter of invention which was originally a part of application, Serial No. 341,609, filed by me February 24, 1890, and upon which Patent No. 437,139 was granted September 23, 1890, to The Rogers Typograph Company, as my assignee, I having withdrawn from said patent application the subject-matter of the present application, which constitutes a division thereof.

My invention includes, respectively, different members of a machine, which latter has as its object and result, briefly stated, assemblage of character and space members into a line of composition, copy of said line, and preparation of the machine for a repetition of the foregoing.

The improvements which relate to the production of a copy of a line of composition are improvements in mechanism for justifying a line of composition and improvements in mechanism for casting a type-bar from such line.

The invention has been devised with especial reference to the mechanism for assembling and distributing character and space members illustrated in the drawings and described in the specification of United States Letters Patent No. 389,108, granted September 4, 1888, to Hoyt, Ruthrauff, and Wagner for a machine for making stereotype matrices, upon the application and assignment of myself. Instead of employing bars having characters formed in relief on their lower ends, as shown in said patent, I herein employ bars having their vertical edges formed with intaglio characters adapted to directly cast type, the product of such casting being a stereotype-line plate in copy of type-matrices and the spaces, and is called a "cast-type bar."

The annexed drawings and the following description set forth in detail one mechanical form of embodiment of the invention, such detail construction illustrating the principle of the invention and being but one of various different mechanical forms in which such principle of invention may be used. Such drawings and description set forth a certain construction of members which are in common with the drawings and description of an application for United States Letters Patent, Serial No. 365,886, filed September 23, 1890, by Fred E. Bright for improvements in typographs, the inventions respectively set forth in this my application and in the said Bright's application all being the property of The Rogers Typograph Company, a corporation under the laws of the State of New Jersey, and it will be understood that my invention does not consist in the construction claimed in said Bright's application. As regards all construction to which claim is laid, broadly, in this my application and also more narrowly in the said Bright's application, it should be understood that my invention consists solely in the subject-matter of such broader claims, and does not consist in the subject-matter of said narrower claims. The mechanism for ejecting the type-bar from the casting-chamber, the trimming mechanism, and the cam mechanism for reciprocating the mold-slide are not herein particularly described, as they form part of the above application of Bright.

Figure 2:
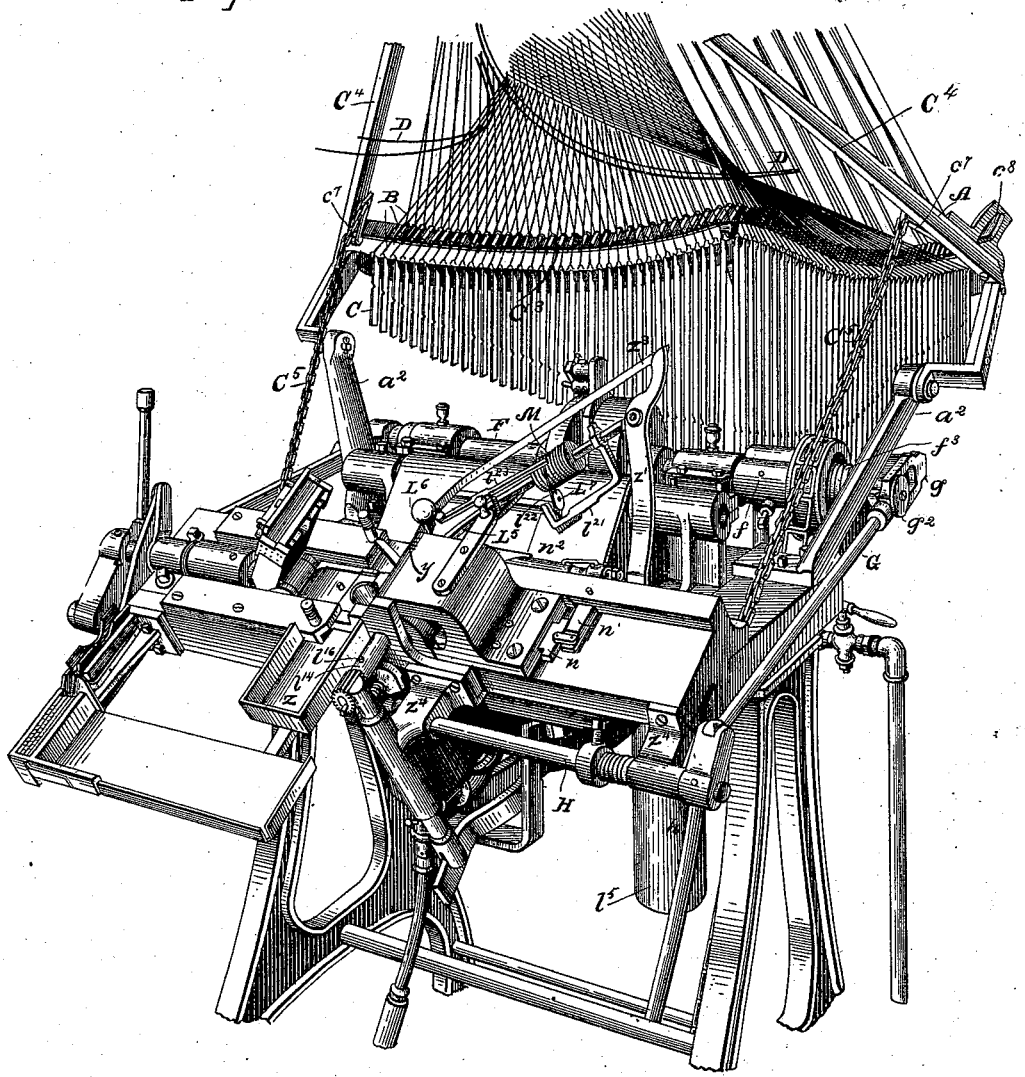
Figure 7:
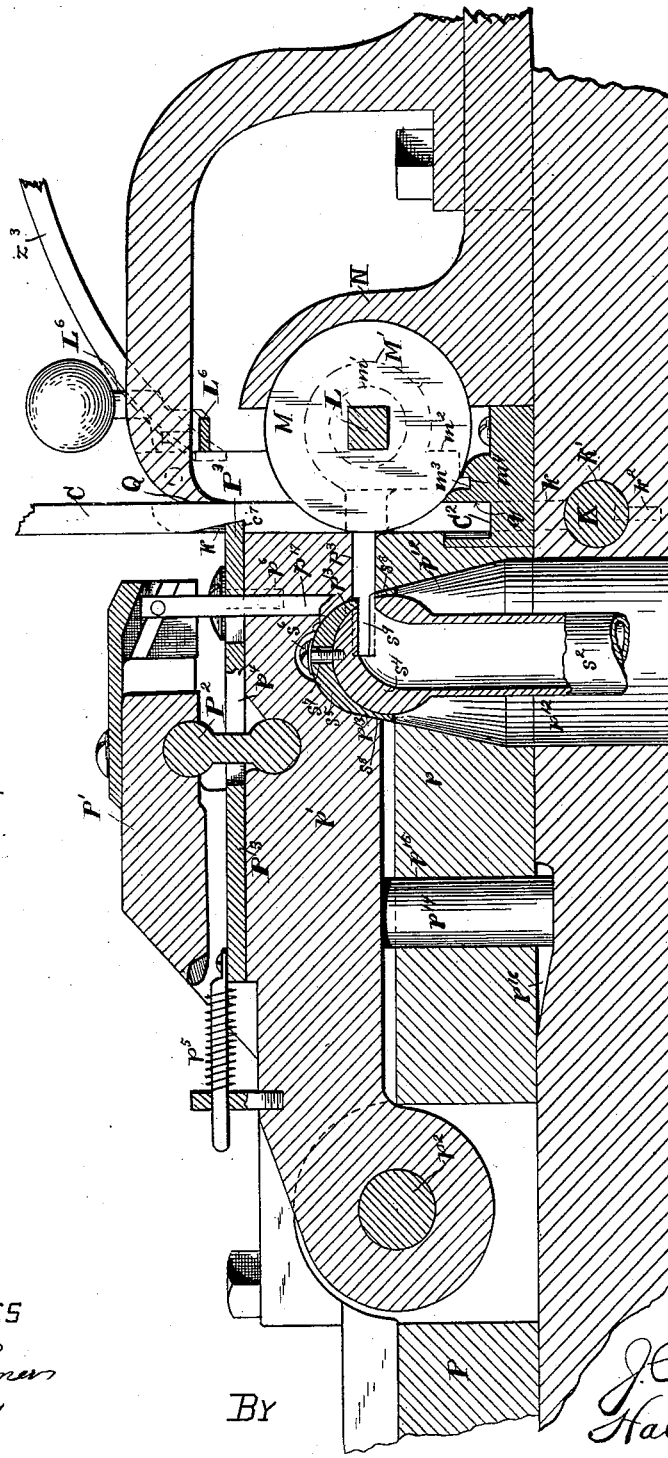
Figure 29:
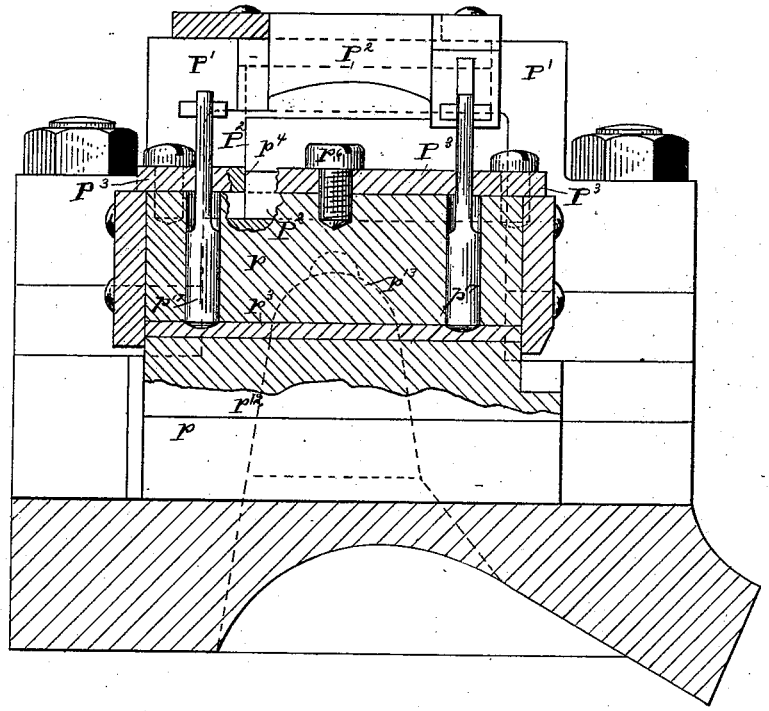
Figure 30:
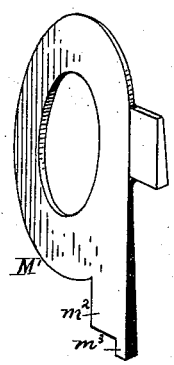
Figure 28:
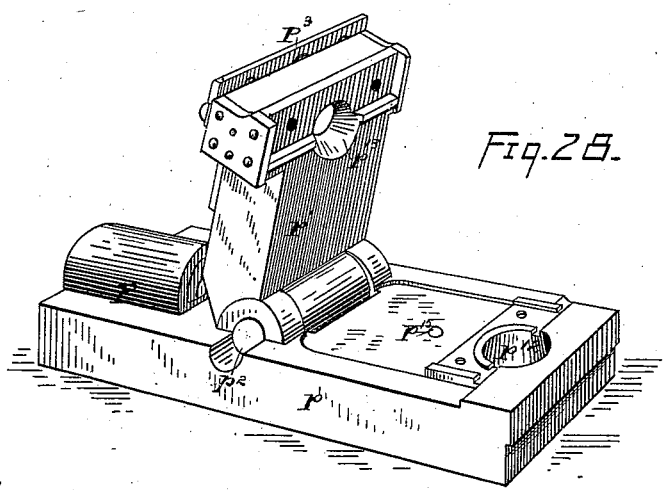

Referring to said drawings, Figure 1 is a perspective view of a typograph embodying the invention. Fig. 2 is a perspective view, on a larger scale than the preceding view, representing a portion of the typograph and showing the upper section of the mold in an arbitrarily-raised position. Fig. 3 is a detail perspective view, portions being broken away to disclose the spaces, space-shaft, space-supporter, and connected mechanism, said figure also showing in position a cap-plate detachably fitted on the right-hand end portion of the mechanism, said cap-plate having been removed in Fig. 2 in order to better disclose the space-supporter-actuating mechanism which said cap-plate covers in the complete machine. Fig. 4 illustrates in perspective the compressor-shaft and connecting mechanism. Fig. 5 is a perspective view showing the same features of invention as are shown in the preceding view, but in different positions. Fig. 6 is a perspective of some of the mechanism shown in the two preceding views and representing the members in different relative position than in either of said views. Fig. 7 is an elevation in vertical section through the mold-sections, space-supporter, and connected mechanism, showing in detail the seating of the metal-discharge conduit and the mechanism for closing and opening the mold. Fig. 8 is a detail view of the lower mold-section in plan and a horizontal sectional view of certain portions of the line-assembling portion of the machine. Fig. 9 is a top plan view, partly in section, showing the mechanism for operating the space-supporter. Fig. 10 illustrates in perspective the metal-pot and its operating connections, also a portion of the main driving-shaft. Fig. 11 is a detail perspective showing the discharge-conduit of the metal-pot. Fig. 12 represents in top plan diagrammatic view the cams on the main driving-shaft, together with the pulley and its pawl connection. Fig. 13 is an edge elevation of the compound space. Fig. 14 is a perspective of said space. Fig. 15 is a detail view representing a compound space in side elevation, the spaceway in transverse section, and the wing-space-section guide in transverse section. Fig. 16 illustrates the compressor-shaft and its groove for deflecting the compressing-arm. Fig. 17 shows in detail the upper or supporting end of a matrix-bar. Fig. 18 is a perspective of a cast type-bar, the product of the machine. Fig. 19 is an elevation of the cam mechanism which operates the metal-pump. Fig. 20 is a diagrammatic elevation of the cam mechanism which operates the metal-pot. Fig. 21 is a detail showing the means for holding the matrix-carrier above its lowest possible point. Fig. 22 is an interior elevation of the pulley, showing its groove. Figs. 23, 24, and 25 respectively illustrate successive positions of the matrix-bars and their two-lip latch in the latter's operation. Fig. 26 is an outline perspective of the matrix-frame and keyboard, showing the relation diagrammatically of these parts to the casting mechanism when in their assembled position. Fig. 27 is a perspective with portions of the machine broken away to disclose the relation of the space-shaft, space-distributer, and space-releasing mechanism to each other. Fig. 28 illustrates in perspective the two mold-sections as detached from the machine and opened so as to disclose the faces of both sections. Fig. 29 is an elevation in transverse section through the casting-chamber with the two mold-sections closed. Fig. 30 is a perspective of a detached wing-section of the compound space. Fig. 31 is an enlarged perspective of the space-shaft and spaceway, having certain portions broken away to disclose their construction at their meeting-point. Fig. 32 is a side elevation of the metal-pot and casting mechanism and certain means for heating the same. Fig. 33 is a transverse elevation of the same features shown in Fig. 32.

The matrix-carrier A has a front central leg $a$ which rests on a base $a'$, Fig. 6, when the matrix-carrier is in position for the assemblage of the matrix-bars in a line of composition. The matrix-carrier is pivoted at its rear portion to stationary supports $a^2$ of the machine, and when the matrix-carrier is in lowered position, either for assembling the matrix-bars or for casting from the latter, it is supported by its pivotal connections with said stationary supports $a^2$ and by said front leg $a$ resting either on base $a'$ or base $a^3$, Figs. 2, 6, and 21. Said two bases project radially from and are rigid with the hereinafter-described counter-shaft H, base $a'$ being of greater radial projection than base $a^3$. Base $a'$ maintains the matrix-carrier slightly elevated above its lowest possible position, so that when the matrix-bars are being assembled in the line of composition their lower ends may be free from frictional contact with the matrix-bar rest $C^2$, located immediately below said line. Base $a^3$ maintains the matrix-carrier in its lowest possible position, which position is proper for taking the cast of the assembled line, and in such casting position the matrix-bars have their lower ends resting upon said rest $C^2$ to align them.

The ways B, which are carried by the matrix-carrier and which in turn directly carry the matrix-bars C, have assemblage portions and distributive portions. The portions of the ways on which the matrix-bars are suspended when assembled together in a line of composition are assemblage portions, while the portions of the ways on which the matrix-bars are suspended, either while distributed or while being distributed, are distributive portions.

The character-bars C are maintained in their distributive positions on the ways B, as the matrix-carrier is in lowered position suitable for assembling the matrix-bars, by two-lip latches C', which latter are operated by suitable key connections. Each character-bar C has one side of its upper extremity formed with a beveled edge $c$, said beveled edge permitting passing of the appropriate lip of the latch between two character-bars.

The latches C', Fig. 26, are loosely fitted and have longitudinal rocking bearing in brackets $c^3$ secured to bow $C^3$, said bow being loosely mounted on the frame $C^4$ of the matrix-carrier, so as to have limited independent movement thereon, the ends of the bow being loosely fitted in slotted bearings $c^8$, which latter are rigid with frame $C^4$, and levers $c^9$, pivoted to said frame, having their rear ends adapted to engage with the ends of bow $C^3$ and having their forward ends connected to chains $C^5$, said chains extending forwardly and downwardly, and there connected to the lower stationary framework of the machine. The construction is such that when the matrix-carrier is swung rearwardly for the purpose of distributing the character members the bow $C^3$ is moved by the levers $c^9$ away from the ways B sufficiently to permit the character members to travel rearwardly on their said ways, free from engagement with the latches $C'$, the bow $C^3$ being moved by the levers $c^9$, the latter being operated when the chains $C^5$ become taut, and carry the latches clear from the path of the character members as the latter pass into their complete distributed position. After the character members are so distributed and when the matrix-carrier is swung in its reverse movement forwardly into position suitable for assembling the character members, the chains $C^5$ become slack and the levers $c^9$ permit bow $C^3$ to fall by its own gravity in bearings $c^8$, so as to again carry the latches $C'$ toward ways B, and said latches are thereupon located in position suitable for engaging with the distributed character members and locking the latter against assembling movement on the ways, except as released by the latches under key operation.

Character-member guides or checks D are located, respectively, to the right and left of the path of movement of the matrix-bars as the latter pass down on the distributive portions of the ways to the assemblage portions, said character-member guides or checks being wires substantially parallel with ways B and having their stems $d$ parallel with and below the assemblage portions of the ways, the forward end of each said wires D being secured to the front central standard $a^4$ of the matrix-carrier, while the body of said wire projects rearwardly and in lateral inclination from said path of movement of the matrix-bars, said rearwardly and laterally projecting extremity of such wire being disconnected from any support and having free spring action. These wires furnish a cushion-bearing for any improperly-swinging matrix-bars as the latter approach the assemblage portions of the ways B, temporarily checking the travel of the lower portions of such matrix-bars, arresting their lateral swing and restoring equilibrium to them, thereby obviating any tendency of such matrix-bars to cross or interlace with each other in movement interfering with normal operation. The foot of a matrix-bar C travels ahead of the eye on account of the friction of the way, while the foot of the matrix-bar has only the resistance of the air. It is desirable, therefore, in order to have the matrix-bar go around the curve in the angular way B and enter the channel between the two parallel plains of the assemblage portions of the ways B that the foot of the matrix-bar should be checked up, so as to allow the eye of the matrix-bar to catch up therewith and thereby cause the matrix-bar to glide into said channel in correct position. When two matrix-bars follow each other closely, one coming from one side of the matrix-carrier and the other coming from the other side of said carrier, there would be a tendency for them to strike each other and lock together in the head or upper part of said channel. Especially would such a tendency obtain when the foot of one matrix-bar swings forward farther than the foot of the other matrix-bar, and to obviate such tendency is the object of these guides or checks D. In addition to such checking of the advance travel of the foot of the matrix-bar the guides or checks cause each matrix-bar to be deflected slightly from its regular course across the head of said channel, thereby bringing such matrix-bar directly in the path of a matrix-bar following it from the other side of the matrix-carrier and thus tending to prevent the locking or clogging in the head of the channel. Treadle E, Figs. 1, 2, and 12, is connected to the lower extremity of a chain $e$, the upward extremity of said chain being connected to a pulley $e'$ loose on main driving-shaft F. Said shaft carries a rigid housing $f$, in which a spring-pawl $f'$ works, and the adjacent face of said pulley $e'$ has groove $f^2$, with which said pawl engages, while a coil-spring $f^3$ has one end secured to said pulley and its opposite end secured to shaft F. The construction of said members is such that one stroke of the treadle causes said pulley-groove to engage with said pawl, so as to rotate shaft F in a one-half revolution, and upon release of the treadle spring $f^3$ returns the pulley to its previous position, while shaft F remains stationary.

The right-hand end of shaft F is provided with a cam $g$, Figs. 2 and 12, which engages with a pin $g'$, projecting from the rear end of a slide-link $g^2$, which latter is secured to the rear extremity of a connecting-rod G. This rod G is reciprocated in one direction by cam $g$ and in the opposite direction by spring $h'$. Said slide-link is connected to shaft F by a guide $g^3$, rigid with said shaft and fitting in the opening of the slide-link. The forward extremity of connecting-rod G is pivoted to an arm $h$, rigidly secured to the right-hand end of counter-shaft H. Said counter-shaft is provided with a coil-spring $h'$, having one end secured thereto, while its opposite end is secured to a stationary part of the machine, said spring when under tension being adapted to rotate the counter-shaft forwardly. Said counter-shaft extends from the right-hand side of the machine horizontally to about the central cross portion of the machine and has rotary movement in suitable bearings $z^4$, projecting from the stationary part of the machine. The left-hand end of said counter-shaft has keyed to it a pinion $h^2$, Figs. 2, 3, 4, 5, and 6, which gears with a rack $h^3$, formed on the forward portion of compressor-shaft K. Said compressor-shaft is provided at its rear extremity with a compressing-arm $k$, projecting at right angles therefrom. The central body of the compressor-shaft is loosely fitted in a cylindrical opening $k'$, formed in the bed-plate of the machine, the bottom of said cylindrical opening being provided with a pin $k^2$, projecting upwardly therefrom and loosely fitted in a groove $k^3$, formed in the lower portion of said compressor-shaft. Said groove is in part of its length oblique to the longitudinal axis of the compressor-shaft, its rear portion being parallel with the longitudinal axis of said shaft, while its forward portion inclines from said rear branch simultaneously toward the front and left side of the machine. The adaptation of said pin and angular groove is to cause the compressor-shaft to be rotated sufficiently on its longitudinal axis, as the shaft is longitudinally moved rearward by the pinion-and-rack gearing, to cause the compressing-arm to be deflected laterally toward the left side of the machine, and thereby throw said arm to one side of the path of movement of the character or space members as the latter are assembled or distributed with reference to the line of composition, and thus avoid interference with the movement of the matrices. Said angular groove also fulfils the office of bringing the compressing-arm parallel with the members of such line as said pinion and rack operate to longitudinally move the compressor-shaft forwardly. Said pinion $h^2$ is provided with an arm $h^4$, Figs. 4, 5, and 21, having recess $h^5$, in which lug $h^6$ on the compressor-shaft is adapted to lock, said lug $h^6$ being rigidly secured to the compressor-shaft rearwardly of its rack $h^3$ and adapted to depend in vertical plane below the compressor-shaft as the latter is at the limit of its forward longitudinal movement, the locking-arm $h^4$ being at such time located parallel with and below the compressor-shaft and its recess $h^5$ then so interlocking with said lug $h^6$ as to positively lock the compressor-shaft against longitudinal movement.

The space-shaft L, Figs. 2 and 3, is located parallel with and above the compressor-shaft, and its forward extremity is provided with a pinion $l$, which gears with a rack $l'$, formed on the upper extremity of a bar $l^2$, which has longitudinal sliding movement within a supporting-sleeve $l^3$, said sleeve having its upper end inclining toward the front of the machine and its lower end inclining toward the rear of the machine. The lower extremity of said bar $l^2$ is provided with a parallel central slot $l^4$, in which loosely fits the forward extremity of a lever L', the rear extremity of said lever having suspended therefrom a weight $l^5$. To the forward central portion of rack-bar $l^2$ is secured an arm $l^6$ projecting at right angles therefrom and loosely fitted in longitudinal slot $l^7$ formed in sleeve $l^3$. A block $l^8$ projects laterally from the forward extremity of said arm $l^6$ and is adapted to be locked in a recess $l^9$ formed in the lower extremity of a bell-crank $L^2$, and when so locked it prevents rack-bar $l^2$ from upward longitudinal movement, as said rack-bar is under the influence of weight $l^5$. The forward extremity of the upper arm of bell-crank $L^2$ is provided with a laterally-projecting pin $l^{10}$, which is adapted to engage with a recess $l^{11}$, formed in the forward extremity of locking-arm $h^4$, said engagement of pin $l^{10}$ in recess $l^{11}$ operating to withdraw recess $l^9$ of the bell-crank from block $l^8$ of arm $l^6$, and thereby permitting rack-bar $l^2$ to be operated by the weight $l^5$. Rack-bar $l^2$ is operated in its reverse movement by engagement of arm $h^4$ with arm $l^6$ as countershaft H is rotated rearwardly, and the same serving to effect the following several operations: rotation of the space-shaft L in movement reverse to that by which the compound spaces expand and justify the line of composition, lowering of arm $l^6$ so that bell-crank $L^2$ may by its own gravity interlock with said arm $l^6$, depressing the forward extremity of lever L' so that the rear extremity of said lever is raised together with weight $l^5$.

Shaft L constitutes a space-carrier common to all the spaces, and on said space-carrier may be assembled a plurality of spaces respectively at different points of the composed line.

On the space-shaft L, Figs. 3, 4, and 5, are fitted a series of compound spaces, respectively formed in two sections, the adjacent faces of which sections are respectively inclined reversely to each other, one section, M, being a disk having a central square opening $m$ corresponding to the square cross-section of the shaft L, said space-disk being adapted to have free sliding movement longitudinally on said space-shaft and to be rocked with the latter. The other section, M', of each space is formed as a wing having a circular opening loosely fitted on a circular hub $m'$ of disk M. That portion of the wing-section M' which is adjacent to the casting-mold has a depending foot $m^2$, which extends to about the lower periphery of disk-section M and is provided with a toe $m^3$, which depends from the forward portion of said foot beyond the periphery of said disk-section. Said toe $m^3$ is constructed to loosely fit in a guard-groove $m^4$, formed in the bed-plate of the machine parallel with the space-shaft, said groove permitting said toe to have travel longitudinally therein and guarding the toe from having movement such as would be possible by rocking movement of the wing-section on hub $m'$, and thus said groove acts as a guard to prevent rocking movement of the wing-section while the disk-section of the compound space is being rocked.

The wing-section has its face adjacent to the disk-section inclining upwardly and away from the latter, while the face of the disk-section which is adjacent to the wing-section is inclined in the reverse direction to the inclination of the adjacent face of said wing-section, the degree of inclination being the same for each of said inside faces of the two sections of the compound space. The disk-section has its outside face formed at right angles to space-shaft L, while the wing-section has its outside face formed also at right angles to said space-shaft. As the space-shaft rocks to justify the line of composition it correspondingly rocks the disk-sections thereon, while the wing-sections are maintained without rocking, thereby causing the inclined engaging faces of the disk-sections, respectively, with their companion wing-sections to have movement, such as results in moving the non-inclined faces of the disk-sections and wing-sections away from each other, while maintaining said non-inclined faces at right angles to the space-shaft. Hence the character members, which may be assembled in a line of composition against these compound spaces, are maintained throughout their lengths parallel to each other while the line of composition is justified.

Space-shaft L is provided with a rigid pin $l^{15}$, Fig. 27, which works in a groove $l^{16}$ formed in a sleeve $l^{14}$, said sleeve being loosely fitted over shaft L intermediate of pinion $l$ and that portion of the shaft in which the spaces are assembled, said sleeve being rigidly secured to the stationary framework of the machine at a point adjacent to said space-assemblage portion of shaft L. That portion of space-shaft L which is inclosed within said sleeve $l^{14}$ rocks freely therein and is also supported thereby, said sleeve being of such length as to permit shaft L to have a limited longitudinal movement therein. Said groove $l^{16}$ of said sleeve is formed oblique to the length of said sleeve, and hence as shaft L is rocked said pin and groove mechanism $l^{15}$ $l^{16}$ causes said shaft L to have a longitudinal movement simultaneously with its rocking movement, such longitudinal movement of the space-shaft being adapted to carry the compound spaces with the latter, so that as the shaft rocks and the assembled spaces expand within the line of composition, said spaces are simultaneously bodily moved transversely to their planes of rotation, such longitudinal movement of the space-shaft L being in the direction of the take-up of the spaces, as the latter have their disk-sections rocked, maintaining said spaces steady, allowing them to move without cramping or binding on said shaft and giving the spaces the free movement desirable to well accomplish their office of justifying the line of composition.

Space-shaft L has its rear extremity connected with a spaceway $L^5$, Figs. 2, 8, and 27, said shaft and way being of the same size and shape in cross-section. When said shaft and way have their sides in the same planes, the joint between them is such as to permit the spaces to pass readily from one to the other. Space-shaft L, Fig. 31, is provided at its end adjacent to way $L^5$ with a tenon $l^{17}$, circular in cross-section, fitted loosely in a corresponding mortise $l^{18}$ and having a transverse annular groove $l^{19}$ in which loosely fits the free extremity of a pin $l^{20}$, rigidly secured to way $L^5$. This construction permits shaft L to have rocking movement independent of way $L^5$, and to have longitudinal movement together with way $L^5$, the upper end of way $L^5$ having free longitudinal sliding bearing in a suitable support $z'$, so that the said shaft and way may jointly have the described longitudinal reciprocation. A space-distributer $L^6$, Fig. 27, is loosely fitted on the space-shaft and spaceway, and is adapted to be moved by the operator's hand rearwardly along them, so as to carry all spaces to the rear side of the pivotal two-lip latch $L^7$, by which said spaces are maintained until released at will of the operator. The upper portion of said space-distributer is provided with a suitable guide-eye $z^2$, which loosely fits about the handle-guide $z^3$, said handle-guide extending in such direction and so formed as to properly conduct the handle end of said space-distributer as the latter performs its office. Said way $L^5$ inclines upwardly and rearwardly from shaft L and in lateral inclination toward the right of the machine, so as to permit space-distributer $L^6$ to carry all spaces from shaft L rearwardly on way $L^5$ out of the path of movement of the matrix-bars. Said way $L^5$ has sufficient inclination to cause the spaces to be assembled by gravity as they are respectively released one at a time by said two-lip latch $L^7$, said latch being pivoted on a support $l^{21}$, and having its stem connected by a small rod $l^{22}$ to a lever $l^{23}$, said lever being adapted to be oscillated by a key $l^{24}$ carried by and having reciprocating longitudinal movement on the matrix-carrier A. Said key $l^{24}$ is carried by the matrix-carrier, and when the latter is in position for assembling a line of composition said key may be pressed down by the operator, so as to depress the power end of lever $l^{23}$, and said lever then operates the space-latch mechanism to release a space, said key having a sliding movement in suitable guiding-supports formed on the matrix-carrier. A guide $l^{25}$ insures the deflection and delivery of the wing-section of the compound spaces into groove $m^4$ of the bed-plate.

The space-supporter N, Figs. 2, 7, and 9, is provided with a tongue $n$, projecting rearwardly and having sliding bearing on the bed-plate of the machine through a suitable guide-way. The rear extremity of said tongue is connected to a transverse lever $n'$, pivoted to the rear portion of the machine and suitably connected at its rear extremity to the right-hand end of a rod $n^2$. Said rod is longitudinally parallel with the machine-bed and has its left end provided, respectively, with a forward stop $n^3$ and a rearward stop $n^4$, and between said two stops an arm $n^5$ is loosely fitted over the rod, so as to have transverse movement thereon without moving the rod, except as said arm engages with either of said two stops. Said arm $n^5$ has its opposite and forward extremity secured rigidly at right angles to the rear side of the mold-slide P, and said arm has free lateral movement in a transverse slot $n^6$ formed in the rear part of the machine-bed. As the mold-slide P moves forward toward the line of composition, arm $n^5$ is thereby carried forward and engages against stop $n^3$, moving connecting-rod $n^2$ toward the right of the machine and thereby causing lever $n'$ to force the space-supporter N against the spaces in the line of composition. Said engagement of members operates to maintain the space-supporter in suitable pressure against the spaces until after the type-bar has been cast, whereupon, by the rearward movement of the mold-slide P, the arm $n^5$ is carried toward the left side of the machine, thereby releasing connecting-rod $n^2$ from pressure toward the right of the machine, and said arm $n^5$ engages with stop $n^4$, so as to draw connecting-rod $n^2$ toward the left of the machine and thereby retract space-supporter N from the spaces. Said mold-slide P has reciprocating movement in a horizontal line and is rigidly connected (see Fig. $7^a$) with the lower section $p$ of the casting-chamber, the upper section $p'$ of the casting-chamber being hinged to said slide P by a knuckle-joint $p^2$, said two sections having the forward portions of their adjacent faces suitably formed to constitute a casting-chamber $p^3$.

Yoke P' is a metal plate, which has two depending side portions detachably clamped rigidly to the framework of the machine, respectively on opposite sides of the guideway in which mold-slide P reciprocates, the body portion of said yoke having its lower face located above the alining-plate $P^3$ sufficiently to permit of the upward-swinging movement of the upper mold-section $p'$.

When slide P is moved toward the right of the machine, brace $P^2$ is brought upright in strongly clamping position between the yoke P' and the upper mold-section $p'$, maintaining the upper section of the mold in securely fixed position, as the casting metal expands in cooling.

Lying on the upper face of upper mold-section $p'$ is the alining-plate $P^3$, and has opening $p^4$, in which works brace $P^2$. The rear portion of said alining-plate is connected with the upper mold-section $p'$ by a spring-pressure device $p^5$, which tends to throw it forward. A screw $p^6$ projects on the forward extremity of the upper mold-section $p'$ and passes loosely through a slot $p^7$ in the alining-plate, thus properly holding the latter down onto mold-section $p'$, while permitting it to have free spring-pressed sliding movement on said mold-section, the construction of said members being such as to cause said alining-plate to project forwardly under operation of the spring-pressure device $p^5$ sufficiently to have said alining-plate engage with the character members in the line of composition and to bring said character members into alinement prior to the engagement of the casting-mold with said character members, the spring-pressure device $p^5$ and slot $p^7$ operating to permit the upper mold-section $p'$ to be carried forwardly against the line of composition in sliding movement beneath the alining-plate. When said alining-plate engages with the shoulders $c^7$ of the matrix-bars, the matrix-carrier is in its lowest possible position and the matrix-bars have their lower ends resting on rest $c^2$, and said matrix-bars, being loosely fitted on the ways B by their oblong eyes $c'$, are permitted to have their respective matrices brought into accurate alinement and are at the same time longitudinally clamped between said alining-plate $P^3$ and said matrix-bar rest $C^2$.

Mold-slide P is longitudinally reciprocated by suitable mechanism connecting same with the main driving-shaft F, and inasmuch as such connecting mechanism may be of any desired character the form herein shown in the drawings is not further described by me and constitutes no part of my invention.

A matrix-bar bearing Q is located parallel with the mold and in front of and higher than the latter, said bearing being for the rear edges of the matrix-bars above their matrices. The wall $q$ to the right of rest $C^2$ is located in the same vertical plane with said bearing Q and lower than the mold, and guides and provides bearing for the lower ends of the matrix-bars, the mold being adapted by the forward movement of mold-slide P to compress the matrix-bars between it on their front edges and said bearing Q and right wall of groove $q$ on their rear edges, such compression of the matrix-bars serving to closely seal their joints with the mold.

The melting-pot R, Figs. 1 and 10, is suspended from trunnions $r$ and is oscillated in forward and rearward movement by an arm R' having its lower portion rigidly secured to the back central portion of the melting-pot, while the upper extremity of said arm is provided with a link $r'$ within which the main driving-shaft is loosely fitted, said arm extending from the melting-pot to said driving-shaft in a direction upwardly and toward the rear of the machine. The upper portion of said link $r'$ is provided with a lateral stud $r^2$, which rides on the upper periphery of a cam $r^3$ rigid with said driving-shaft. The lower portion of said link $r'$ is provided with a lateral stud $r^4$ which engages with the lower portion of the periphery of the cam $r^3$. The construction of such members is to cause a positive movement of the melting-pot forward and upward during a certain portion of the revolution of the main driving-shaft F and to cause a positive withdrawal of said melting-pot from said forward and upward position back to its normal position during a certain other part of the revolution of said driving-shaft.

The melting-pot may be heated by any suitable means. In Figs. 32 and 33 of the drawings I, however, show one form of heating means which I have heretofore used, the same consisting of a gas-burner R$^2$ of circular shape, supported beneath the melting-pot and having a gas-supply pipe $r^7$ provided with a valve $r^8$ to regulate the supply. Between said valve and burner a flexible pipe $r^9$ is located, which connects with an auxiliary burner R$^3$ supported on the primary conduit $s'$ of said melting-pot. A hood R$^4$ covers the melting-pot to assist in concentrating the heat, and a deflector R$^5$ is secured in front of the secondary conduit $s^2$ of the melting-pot for the same purpose. It will be understood that the reason why I do not show said heating means in certain other of the drawings illustrating the same mechanical members shown in said Figs. 32 and 33 is because it would detract from the clear representation therein of the said mechanical members.

The melting-pot is provided with a force-pump S, operated by a lever S', said lever having a spring S$^2$, which tends to maintain it in lowered position, and being connected with a link S$^3$, whose upper extremity is engaged with a cam $s$ rigid with the main driving-shaft F. During a certain portion of the revolution of the main driving-shaft said link S$^3$ is operated, so as to raise the plunger of the force-pump ready for the latter's action, while at another portion of the revolution of said driving-shaft said spring S$^2$ becomes operative to draw lever S' downward, and thereby cause the plunger of said force-pump to eject molten metal from the melting-pot through the intermediate discharge into casting-chamber $p^3$.

The force-pump S, Fig. 10, is provided with a primary conduit $s'$ rigid therewith. A secondary conduit $s^2$ has its rear extremity connected to the forward extremity of said primary conduit by a universal-joint connection $s^3$. The forward extremity of said secondary conduit $s^2$ is provided with a nozzle $s^4$, Fig. 7, having a semispherical end over which loosely fits a cap $s^5$, a screw $s^6$ being threaded into the central top of said nozzle, while the stem of said screw is loosely fitted in a hole $s^7$ formed in the central top of said cap. The head of said screw $s^6$ has bearing on the top of said cap $s^5$, and the relative dimensions of said members are such that said cap may have a limited movement in any direction over said nozzle, so as to conform itself accurately to the opening $p^{12}$, which passes completely through the central part of the forward portion of lower mold-section $p$ and into the lower portion of the forward central part of upper mold-section $p'$. Said opening $p^{12}$ is formed with front and rear straight-sided walls $p^{13}$ in that portion thereof which is located in same plane with casting-chamber $p^3$, and cap $s^5$ is formed with straight exterior front and rear sides $s^8$, which exactly fit between said walls $p^{13}$. Said walls $p^{13}$ inclining toward each other as they extend upwardly, and walls $s^8$ also inclining toward each other as they extend upwardly, said cap $s^5$ may be wedged in said opening $p^{12}$.

In the drawings I have shown the engaging wall of the melting-pot discharge-conduit as conical, but it may be of other form provided the same corresponds with the foregoing description. Both the nozzle $s^4$ and the cap $s^5$ are provided with lateral discharge-openings $s^9$, adapted to be located in the same plane and to communicate with casting-chamber $p^3$ when said cap $s^5$ has been thrust upwardly as far as possible within opening $p^{12}$. The upper portion of said opening $p^{12}$, Figs. 8 and 28, forms at its front side a semicircular recess $r^{10}$ having an ingate for the molten metal from the melting-pot to be discharged into the mold-chamber $p^3$, said recess being formed in the rear wall of the mold-chamber and opposite to the front open side of the mold-chamber, which is for presentation to the line of composition. The mold-chamber has said recess $r^{10}$ formed therein midway of its length, and has two end portions $r^{12}$, respectively located on opposite sides of said recess, and the spherical conduit of the melting-pot is constructed to fit within said recess and to have its lateral discharge-orifice register with the ingate, the upper portion of said opening $p^{12}$ being of such dimension relative to the discharge-conduit of the melting-pot that the extreme upper portion of said discharge-conduit may pass above the plane of the mold-chamber, and thereby bring its lateral discharge-orifice $s^9$ into same plane with the ingate and the mold-chamber. Should the discharge-conduit so expand by heat that it will not at any operation pass up into opening $p^{12}$ quite so far as it does under normal conditions, said lateral orifice $s^9$ may still register sufficiently with said ingate, and at the same time the discharge-conduit will be wedged tightly between the front and rear walls $p^{13}$ of said opening $p^{12}$. Said front wall of opening $p^{12}$ being located at the central rear portion of the mold, opposite its open front side, while said rear wall of opening $p^{12}$ is located to the rear of said front wall and between said front and rear walls $p^{13}$, the spherical discharge-conduit of the melting-pot is constructed to be tightly wedge-fitted. The object and advantage of forming the said recess $r^{10}$ in the rear wall of the mold-chamber and providing said recess with an ingate are that thereby the roughness incident to breaking off the sprue of the cast type-bar R$^6$ may be formed at a point thereon which will not be a part of nor interfere with the base of the cast type-bar—that is, that the roughness caused by the broken sprue of the type-bar shall be formed in a line thereon other than the line of the base, to the end that a number of desirable objects may be thereby obtained: first, that the rough portion caused by breaking off the sprue may project from the cast type-bar in such a manner as not to require being shaved or cut off in any wise preparatory to the proper condition of the type-bar for use; secondly, that all dimensions of the cast type-bar, alike as to length, thickness, and height, may depend solely on the mold, which avoids cutting or trimming; thirdly, that less metal is required to form a type-bar and yet leave it amply strong for all its purposes.

According to the construction and operation of my invention, when the discharge-conduit of the melting-pot is withdrawn from said recessed ingate by its downward movement substantially at right angles to the plane of the mold-chamber and said ingate the nozzle of said conduit thereby cuts off the sprue or any slight projection from the sprue portion of the cast type-bar $R^6$, Fig. 18, leaving the latter with an arch $r^{13}$ in its bottom, and the roughness where the sprue is broken off being within said arch $r^{13}$ above the line of the base or bottom of the type-bar, the rough portion where the sprue is broken off being thus without injury or detriment to the desired use of the type-bar, so that it need not be trimmed or in anywise changed, and the type-bar is also provided with two base-supports $r^{14}$, respectively formed in its end portions on opposite sides of said bottom arch $r^{13}$, said base-supports $r^{14}$ being as true and smooth as a mold can form.

The upper mold-section $p'$ is swung open, after the type-bar has been cast, by pin $p^{14}$, loosely fitted in an opening $p^{15}$ formed transversely in the lower mold-section $p$, the top of said pin having engagement against the bottom of the upper mold-section $p'$, while the bottom of said pin has free sliding engagement with an incline $p^{16}$ in the bed of the machine below the lower mold-section $p$. Two ejectors $p^{17}$ respectively depend from yoke $P'$, the upper extremity of each ejector being suitably formed in connection with the coöperating construction of the guideway in which it works, so as to cause the ejectors to properly operate to discharge the cast type-bar as the upper mold-section $p'$ moves rearwardly and upwardly. The cast type-bar is discharged into galley $z$ to be taken from said galley by the hand of the operator and properly placed on the trimming mechanism, so as to be suitably trimmed prior to being taken from the machine and set up in column or page form of composition. This trimming mechanism T, located on the left-hand side of the machine, may be of any suitable form. The form shown in the drawings not constituting part of my invention is not herein further described, but is described in the application of Bright hereinbefore referred to, as the same is his invention.

The operation of the invention is as follows: The matrix-carrier A being in downwardly-swung position and having its front leg $a$ resting on base $a'$, Fig. 6, of counter-shaft H, and compressing-arm $k$ being swung to the left of the path of movement of the matrix-bars, the latter, together with the spaces, are suitably assembled by proper key movement to form a line of composition in front of the mold, the latches $C'$ having their appropriate lips inserted between any two matrix-bars by reason of the latter's inclines $c$, so as to cause release from said latches of only the proper matrix-bars. The operator having observed, aided by gage-lines $y^2$, Fig. 2, the assembling of matrix-bars and spaces in estimated quantity sufficient to constitute the desired line of composition, he desists further key manipulation and gives treadle E its primary stroke. The operation of the members of the machine incident to casting each type-bar is divided into two movements, respectively, of the treadle and of the main driving-shaft F, each said movement of said driving-shaft being a half-revolution of the latter, and the two together constituting a complete revolution of the shaft in one direction, so that the production of each cast type-bar from the machine is caused by one complete revolution of the main driving-shaft, subdivided into two semirevolutions in the same direction, each said complete revolution of the main driving-shaft being the result of two full-stroke movements of the treadle, respectively a primary and a secondary treadle movement.

The primary treadle movement operates, through the hereinbefore-described mechanism, as follows: first, to bring compressing-arm $k$ into position parallel with the line of composition and to a predetermined point positively fixed for the length of the line of composition when the latter is finally justified; second, to rotate and longitudinally move space-shaft L so as to cause disk-sections M of the compound spaces to suitably move together to cause the spaces to expand the line of composition to its fullest possible extent, as limited by the set position of compressing-arm $k$; third, to move mold-slide P toward the justified line of composition, said mold-slide carrying alining-plate $P^3$, which engages with the matrix-bars to place their matrices in line, said mold-slide also operating space-supporter N, so that the latter may provide rear bearing for the spaces as the latter are pressed at their forward edges by the mold, said mold-slide also forcing the mold closely against the front edges of the matrix-bars and the spaces of the line of composition; fourth, to swing the melting-pot R forwardly and upwardly, with its discharge-conduit wedged tightly against the casting-chamber $p^3$; fifth, to actuate the pump-plunger in discharge of molten metal into the casting-chamber.

The secondary treadle movement, which rotates the main driving-shaft F in its final half of its complete revolution, actuates the members of the machine, through the herein-described mechanism, as follows: first, to withdraw the plunger of the pump; secondly, to withdraw the melting-pot discharge-conduit from the casting-chamber; thirdly, to move mold-slide P toward the left of the machine, thereby releasing the line of composition from the pressure of the mold, releasing the spaces from the pressure of the space-supporter, swinging up the upper mold-section, and actuating the mechanism which ejects the type-bar from the casting-chamber; fourthly, to rotate the space-shaft L in reverse to its previous movement and place the connecting mechanism in suitable position for a repetition of the operation thereof described under the first treadle movement; fifthly, to move compressor-shaft K rearwardly and throw its arm $k$ out of the path of movement of the matrix-bars in reverse to its movement described under the first treadle movement.

Said primary treadle movement accomplishes its previously-described operation, more in detail, as follows: Driving-shaft F releases its cam $g$ from slide-link $g^2$, and counter-shaft H is thereupon quickly moved in forward rotation by the recoil of the tension-spring $h'$. Base $a'$ is moved forward from leg $a$ of the matrix-carrier, and said leg thereupon rests on base $a^3$. Compressor-shaft K is moved longitudinally forward by pin-and-rack gearing $h^2 h^3$, and is also partially rotated, so as to swing compressing-arm $k$ upwardly and toward the right of the machine, thereby bringing said compressing-arm into parallel line with the assembled matrix-bars, the extent of the said forward movement of the compressor-shaft being positively predetermined by the construction of the connecting members to correspond with the length of the type-bar to be cast. Rack-bar $l^2$ is thereupon released from its locked lowered position by arm $h^4$ tripping bell-crank $L^2$ from its engagement with arm $l^6$, and said rack-bar $l^2$ is quickly thrown in upward movement by the weight $l^5$ operating lever L'. Said upward movement of rack-bar $l^2$, by its engagement with pinion $l$ of space-shaft L, rotates the latter in direction suitable to expand and justify the line of composition, and by the pin-and-groove mechanism $l^{15}$ $l^{16}$ also moves said space-shaft L longitudinally toward the rear of the machine. Such movement of the space-shaft moves the compound spaces in a transverse movement bodily toward the rear of the machine, and simultaneously rotates the disk-sections M of the spaces. Said rotation of the disk-sections M, in connection with the non-rotary movement of the wing-sections M', expands the line of composition to its fullest extent and accurately justifies the same, while simultaneously the matrix-bars are maintained parallel to each other throughout their entire lengths by reason of the reverse transverse inclination of the two companion sections of each compound space. The main driving-shaft thereupon, by the mechanism intermediate thereof and the mold-slide P, moves the latter forwardly toward the right of the machine, the alining-plate P³ thereupon engaging with the notched edges $c^7$ of the matrix-bars prior to the engagement of the mold with the latter, and said matrix-bars are alined so that their matrices may be all in the same transverse plane suitable for casting. Such forward movement of the mold-slide also throws space-supporter N forwardly in movement toward the left of the machine by the described mechanism connecting said space-supporter with the mold-slide, and said space-supporter thereupon bears against the rear or right-hand edges of the disk-sections M of the compound spaces, and the front walls of the upper and lower mold-sections $p$ $p'$ are forced in bearing against the front or left-hand edges of the matrix-bars and the spaces of the line of composition. Main driving-shaft F thereupon, through its cam $r^3$, operates arm R' of the melting-pot R, so as to swing the latter forwardly and upwardly. Cap $s^5$ of the discharge-conduit is forced in wedge-bearing up within opening $p^{12}$ of the mold, and lateral discharge-opening $s^9$ is thereupon placed in same plane and in open communication with casting-chamber $p^3$. Driving-shaft F thereupon, through its cam $s$, operates the plunger-actuating mechanism of force-pump S and a charge of molten metal suitable for taking a cast is discharged into the casting-chamber $p^3$.

After a brief duration, sufficient to insure the cooling and proper setting of the cast type-bar, the treadle E is given its secondary movement, which actuates the previously-described mechanism as follows: Cam $s$ of the main shaft F draws link $S^3$ upwardly, thereby withdrawing the plunger of the force-pump S from its forward-stroke position and placing same in position for a repetition of its metal-discharging action, said upward movement of link $S^3$ also simultaneously placing spring $S^2$ under tension, so that upon release of said arm by said cam said spring may have the power to again operate the metal-pump in its discharging action. The main driving-shaft thereupon, by the mechanism connecting same with mold-slide P, withdraws the latter from its forward position, such withdrawal of the mold-slide toward the left of the machine releasing the line of composition from the pressure of the mold and the alining-plate against the front edges of said line of composition, also releasing the space-supporter N from its pressure against the rear side of the spaces in the line of composition, also releasing the upper mold-section $p'$ from the locking action of brace $P^2$, also opening the mold-section $p'$ by the pin $p^{14}$ and inclined plane $p^{16}$, and operating the ejectors which discharge the type-bar from the casting-chamber. Main driving-shaft finally, through its cam $g$, operates slide-link $g^2$, so as to draw connecting-rod G longitudinally toward the rear of the machine, thereby rotating counter-shaft H rearwardly, and in turn moving a compressor-shaft K toward the rear of the machine and swinging compressing-arm $k$ downwardly and to the left of the machine, out of the path of movement of the matrix-bars, and also lowering rack-bar $l^2$ by the engagement of the lower end of arm $h^4$ with the upper edge of arm $l^6$, so as to rotate space-shaft L in reverse to its movement in justifying the line of composition, permitting bell-crank $L^2$ by its gravity to interlock with and hold down arm $l^6$ and raising weight $l^5$. The matrix-carrier A may then be swung backwardly, so as to distribute the matrix-bars which were previously in the line of composition, and the spaces which were previously in the line of composition may be moved by the space-distributer $L^6$ rearwardly and off from space-shaft L onto spaceway $L^5$ and upwardly on the latter till the spaces are to the right of and locked by the two-lip latch $L^7$, the construction of the space-shaft L, its spaceway $L^5$, and the mechanism which operates shaft L being conjointly adapted to cause the angular sides of said two members to respectively register with each other at such time, so as to permit the spaces to pass readily from the one to the other.

The cast type-bar, which constitutes the product of the foregoing-described operation of the invention, may then be trimmed.

The foregoing description and accompanying drawings set forth in detail mechanism embodying my invention. Change may be made therein, provided the principles of construction respectively recited in the following clauses are employed.

I therefore particularly point out and distinctly claim as my invention—

1. The combination with a movable character-member carrier having a series of ways, and character members traveling on the latter, of a base on which the assembled character members rest when in alinement, a support which maintains said carrier raised while the character members are assembled so as to clear the latter from said base, and means for removing said support and permitting said carrier to drop to position wherein the assembled character members may rest on said base when in alinement, substantially as set forth.

2. The combination with a movable character-member carrier provided with a bearing and having a series of ways and character members traveling on the latter, of a base on which the assembled character members rest while in alinement, a rock-shaft which supports said carrier-bearing at different times at different elevations, whereby said carrier may be maintained in position while the character members are assembling so as to clear the latter from said base, and whereby said carrier may be maintained in its lower position after the character members are assembled so that the latter may rest on said base when alined, substantially as set forth.

3. The combination with a movable character-member carrier provided with a bearing and having a series of ways, and character members traveling on the latter, of a base on which the assembled character members rest when alined, a rock-shaft having two supports for said carrier-bearing, said supports projecting different distances from the shaft and adapted to maintain said carrier-bearing at different elevations, whereby said carrier may be held while the character members are assembled so as to clear the latter from said base and may then be held in lower position so as to permit the assembled character members when alined to rest on said base, substantially as set forth.

4. The combination with a swinging character-member carrier supported at its rear by trunnion-bearings and supported at its forward central portion by a leg, said carrier having a series of ways on which character members travel, and a base independent of said carrier on which the assembled character members rest when alined, of a spring-actuated rock-shaft, and justifying mechanism connected with the latter, said shaft carrying two supports of different projection for said leg, substantially as set forth.

5. The combination with a character-member way having its assemblage portion angular to its distributive portion, and a character member, of a guide or check located on the distributive side of the angular junction of said assemblage and distributive portions and constructed to be engaged by the assembling character member before the latter passes from said distributive portion onto said assemblage portion, substantially as set forth.

6. The combination with a character-member way having its assemblage portion angular to its distributive portion, and a character member, of a guide or check angular to the path of the assembling character member and constructed to be engaged by the latter while on said distributive portion, substantially as set forth.

7. The combination with a character-member way having its assemblage portion angular to its distributive portion, and a character member, of a guide or check having free spring action and constructed to furnish a cushion-bearing for the assembling character member, substantially as set forth.

8. The combination with a character-member way having its assemblage portion angular to its distributive portion, and a character member, of a guide or check having a free yielding extremity and constructed to be engaged by the assembling character member, substantially as set forth.

9. The combination with traveling character members, and ways having assemblage portions collected together at different elevations in a common plane and having distributive portions respectively located in lines angular to said plane, of two guides or checks each having a yielding rear extremity angular to the path of the assembling character members and constructed to be engaged by the lower portions of the latter before traveling from off said distributive portions onto said assemblage portions, substantially as set forth.

10. The combination with character members, and means for assembling them in line, of two rear bearings for the character members, respectively located in transverse planes to the latter which do not pass through the characters, said character members being without rear bearing for those portions thereof which are in transverse plane with said characters, and spaces fitting in between said two rear bearings, and extending into said line substantially as set forth.

11. The combination with character members and means for assembling and compressing them in line of a rocking space-carrier, and spaces constructed to be expanded by the rocking movement of said carrier, said spaces further constructed to have travel on said space-carrier longitudinally thereof, substantially as set forth.

12. The combination with character members and means for assembling and compressing them in line, of a rocking space-carrier and compound spaces fitted on the latter and constructed to expand the line by rocking movement of said carrier, said spaces also constructed to have travel longitudinally on said carrier, each of the engaging faces of the parts of each space being inclined reversely to the other, substantially as set forth.

13. The combination with character members, and means for assembling and compressing them in line, of a space-shaft common to all the spaces and located directly opposite and out of said line, and spaces constructed to fit in said line while on the space-shaft, substantially as set forth.

14. The combination with character members, and means for assembling and compressing them in line, of a space-shaft common to all the spaces and located directly opposite and out of said line, spaces constructed to fit in said line while on the space-shaft, and justifying mechanism formed independent of said compressing means, substantially as set forth.

15. The combination with character members, and means for assembling and compressing them in line, of spaces constructed to expand the line by rocking movement, and mechanism constructed to simultaneously rock said spaces and move them bodily along said line, substantially as set forth.

16. The combination with character members, and means for assembling and compressing them in line, of a rocking space-carrier, and means for moving the latter at right angles to its plane of rocking movement simultaneously with such rocking movement; spaces on said carrier constructed to expand said line by said rocking movement of the carrier and at the same time to be carried bodily along said line, with the carrier as the latter moves at right angles to its said plane of rocking movement, substantially as set forth.

17. The combination with character members, and means for assembling and compressing them in line, of a rocking space-carrier, and means for moving the latter endwise simultaneously with its rocking movement; spaces constructed to expand said line by rocking movement of the carrier and to be at the same time carried bodily along said line by the endwise movement of the carrier, substantially as set forth.

18. The combination with character members, and means for assembling and compressing them in line, of a rock-shaft carrying spaces constructed to expand said line by rocking movement, a relatively-fixed member of the machine connected to said rock-shaft by a pin-and-groove connection which causes said shaft to travel longitudinally as it is rocked, substantially as set forth.

19. The combination with character members, and means for assembling and compressing them in line, of a rock-shaft carrying spaces constructed to expand said line by rocking movement, a sleeve rigidly secured to the machine-bed and through which said shaft projects, said shaft and sleeve connected by pin-and-groove connection, said groove being angular to the axis of said shaft, substantially as set forth.

20. The combination with character members, and means for assembling them in line, of a longitudinally-movable compressor-shaft a rocking space-carrier carrying spaces constructed to expand said line by the rocking movement of said carrier, together with actuating mechanism constructed to first move said compressor-shaft longitudinally and then to rock said space-carrier, substantially as set forth.

21. The combination with character members, and means for assembling them in line, of a longitudinally-movable compressor-shaft and a rocking space-carrier carrying spaces constructed to expand said line by the rocking movement of said carrier; intermediate connecting mechanism constructed to first actuate said compressor-shaft in longitudinal movement, then lock said compressor-shaft against longitudinal movement, and then rock said space-carrier, substantially as set forth.

22. The combination with character members, and means for assembling and compressing them in line, of a rotary shaft, a rock-shaft, and justifying mechanism connected to the latter, said rotary shaft provided with a cam which engages with a stud projecting from a slide-link which latter connects together said two shafts substantially as set forth.

23. The combination with character members, and means for assembling and compressing them in line, of a rotary shaft, a rock-shaft, and justifying mechanism connected to the latter; intermediate connection between said two shafts, a treadle, a pulley loosely secured to said rotary shaft, and connection between said treadle and pulley, substantially as set forth.

24. The combination with character members, and means for assembling and compressing them in line, of a rock-shaft carrying a cam, and an arm actuated by said cam; a rocking space-carrier, a rack engaging with the latter, and an automatically-operative lever which actuates said rack in one direction, said arm being connected to said rack, said carrier carrying spaces constructed to expand said line by its rocking movement, substantially as set forth.

25. The combination with character members, and means for assembling and compressing them in line, of an expansible space having a rocking section and a non-rocking section, the latter section provided with a projection, and a machine member having a groove in which the projection of said non-rocking section loosely fits, substantially as set forth.

26. The combination with character members, and means for assembling and compressing them in line, of spaces constructed to expand said line by rocking movement, a rocking space-carrier on which said spaces loosely fit when in said line, together with a spaceway jointed to said carrier so that the latter may have rocking movement independent of said way, said spaces having travel on said way to and from said carrier, substantially as set forth.

27. The combination with character members and means for assembling and compressing them in line, of spaces constructed to expand said line by rocking movement, a rocking space-carrier on which said spaces loosely fit when in said line, together with a spaceway jointed to said carrier, said carrier and way having similar cross-sections constructed to be located at proper times in same planes with each other, whereby said spaces may freely slide from one to the other, substantially as set forth.

28. The combination with character members and means for assembling them in line, of spaces constructed to expand said line by rocking movement, a rocking carrier on which said spaces loosely fit when in said line, together with a spaceway jointed to said carrier, and having right-angular cross-sections therewith, said spaceway being inclined and constructed to cause the spaces to be assembled on said carrier by gravity travel down the way, substantially as set forth.

In testimony that I claim the foregoing to be my invention I have hereunto set my hand this 20th day of September, A. D. 1890.

J. R. ROGERS.

Witnesses:
JAMES J. THORNLEY,
JAS. J. THORNLEY, Jr.